United States Patent [19]
Lincoln

[11] Patent Number: 5,603,594
[45] Date of Patent: Feb. 18, 1997

[54] FASTENER RETENTION SYSTEM

[75] Inventor: Thomas C. Lincoln, Arcadia, Calif.

[73] Assignee: Uni Star Industries, Inc., South Pasadena, Calif.

[21] Appl. No.: 414,435

[22] Filed: Mar. 31, 1995

[51] Int. Cl.⁶ .................................................. F16B 27/00
[52] U.S. Cl. ........................... 411/84; 411/104; 411/966
[58] Field of Search ................................. 411/84, 85, 87, 411/88, 104, 966, 999, 533, 539

[56] References Cited

U.S. PATENT DOCUMENTS

| | | | |
|---|---|---|---|
| 2,029,089 | 1/1936 | Weirauch | 411/84 |
| 2,879,820 | 3/1959 | Trzcinski | 411/84 |
| 3,146,010 | 8/1964 | Dellith | 411/539 |
| 3,339,215 | 9/1967 | Flood | 411/966 |
| 3,339,953 | 9/1967 | Bohn | 411/84 |
| 4,227,722 | 10/1980 | Barber | 411/84 |
| 4,504,180 | 3/1985 | Ishii | 411/539 |
| 4,877,364 | 10/1989 | Sorrentino | 411/999 |
| 5,114,203 | 5/1992 | Carnes | 411/999 |
| 5,281,064 | 1/1994 | Zimmer | 411/85 |

Primary Examiner—Steven N. Meyers
Assistant Examiner—Gary Estremsky
Attorney, Agent, or Firm—Lyman R. Lyon, P.C.

[57] ABSTRACT

A fastener has a head portion with a torque accepting surface and a cylindrical recess on an external surface thereof defining a pair of axially spaced annular shoulders for acceptance in a circular fastener accepting aperture in a connector component. The aperture has a counterbore for the acceptance and seating of the head portion of the fastener and a channel extending radially of a longitudinal axis of the aperture therein for the acceptance of the fastener in translation, the channel having parallel shoulders spaced slightly greater than the diameter of the cylindrical recess in the head portion of the fastener but less than the minimum diameter of at least one of the shoulders thereon.

3 Claims, 1 Drawing Sheet

FASTENER RETENTION SYSTEM

BACKGROUND OF THE INVENTION

This invention relates generally to connectors and more specifically to system for retaining a fastener on a connector component to facilitate assembly thereof with another connector component or mounting base.

The fixed component of a connector pair, or a mounting surface for a moveable connector component, is often relatively inaccessible. Thus, when a discrete, disassociated fastener is utilized to secure the movable connector component to the fixed mating component or support surface, disassociation of the fastener or loss of proper alignment of the fastener with a complimentary aperture in the fixed component presents a significant problem. Accordingly, a need exists for a fastener retention system that positively retains and orientates a fastener on a movable connector component to facilitate assembly thereof with a fixed component.

SUMMARY OF THE INVENTION

The aforesaid problem relating to retention and orientation of a fastener on a movable connector component prior to assembly of the component to form, for example, a connector pair is solved, in accordance with a preferred constructed embodiment of the present invention, by a fastener retention system comprising of a unique multi-level configuration on the movable component that cooperates with a unique configuration on the fastener so as to accept the fastener in locking relationship.

More specifically, in accordance with an exemplary constructed embodiment of the present invention, the movable component of a connector assembly is provided with one or more circular mounting apertures for the acceptance of fasteners that retain the connector components in the assembled condition. Laterally extending channels in the connector component communicate with a relatively large opening or exterior of the connector component and with each circular mounting aperture therein, respectively, to accommodate lateral translation of the fasteners into the circular mounting apertures. Each fastener moves in translation with its central axis parallel to the central axis of a circular mounting aperture. An annular recess on the fastener O.D. cooperates with complementary shoulders in the channel and a counterbore in the circular mounting aperture of the movable connector component so as to capture the fastener. Dimensions are controlled to minimize both axial and radial displacement of the fastener within a counterbore in the circular mounting aperture in the movable connector component while allowing for rotation and advancement of the fastener into a complimentary threaded aperture in a mating connector component or mounting base.

DETAILED DESCRIPTION OF THE PREFERRED EMBODIMENT(S)

Figure 1:
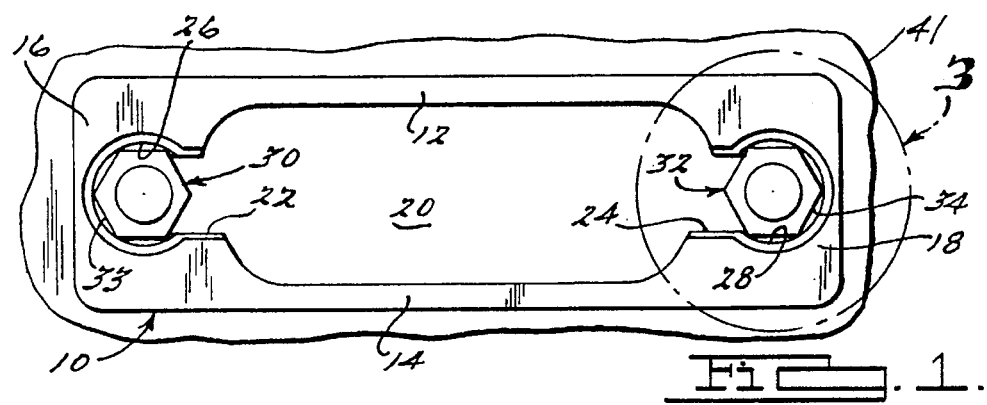
FIG. 1 is a plan view of a connector component having a pair of fasteners captured thereon in accordance with the instant invention.
Figure 5:
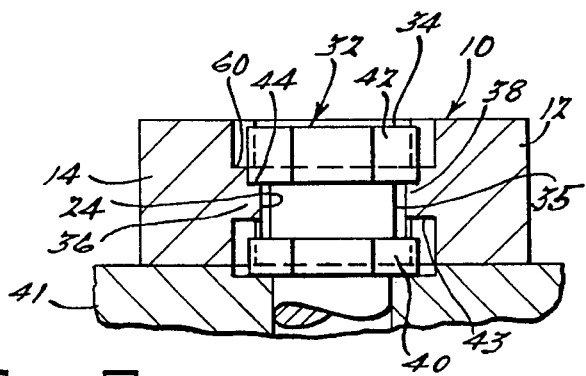
FIG. 5 is a cross-sectional view taken along the line 5—5 of FIG. 4.

As seen in FIG. 1, a movable connector component 10 is of generally rectangular configuration defined by parallel side walls 12 and 14 that are joined together by end walls 16 and 18 thereby to define a central opening 20. In accordance with the present invention, the end walls 16 and 18 of the connector component 10 are provided with channels 22 and 24, respectively, that extend radially of and communicate with a pair of circular fastener mounting apertures 26 and 28, respectively. A pair of fasteners 30 and 32 are accepted and trapped within the apertures 26 and 28, respectively, as will be described. The fasteners 30 and 32 have head portions 33 and 34, respectively, with annular recesses 35 therein. Only the recess 35 in the head 34 of the fastener 32 is illustrated in FIG. 5 for purposes of clarity.

The annular recess 35 in the head 34 of the fastener 32 is of smaller diameter than the width of a pair of opposed parallel shoulders 36 and 38, that define the channel 24 thereby to accommodate assembly of the fastener 32 with the movable connector component 10. In addition, the recess 35 on the fastener 32 defines a pair of axially spaced shoulders 40 and 42 that are accepted in counterbores 43 and 44, respectively, in the apertures 28. The shoulder 42 eventually is seated on the counterbore 44, as will be described.

Figure 2:
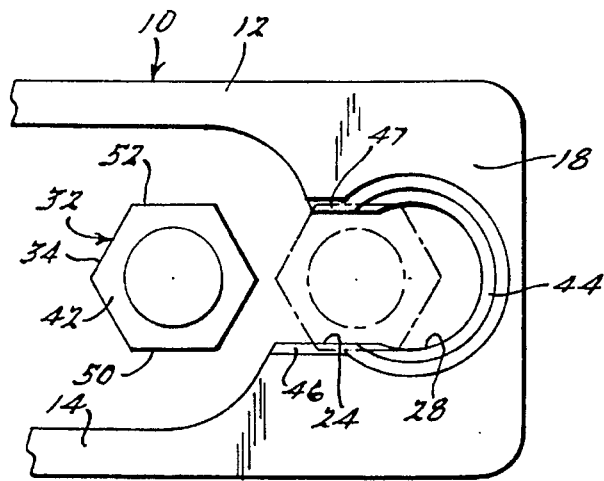
FIG. 2 is a view showing the assembly procedure of the fasteners with the connector component.
Figure 3:
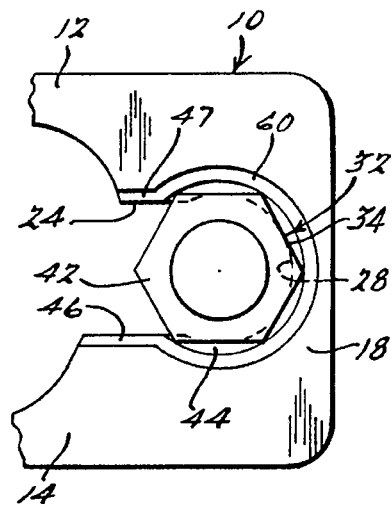
FIG. 3 is an enlarged view taken within the circle "3" of FIG. 1.
Figure 4:
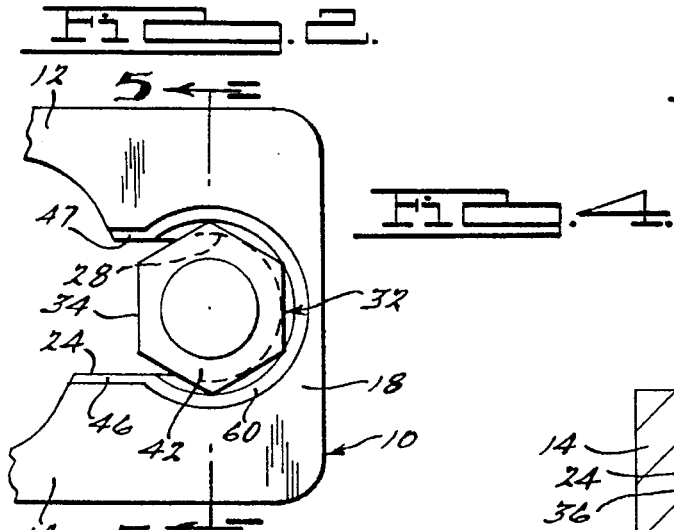
FIG. 4 is a view fastener similar to FIG. 3 showing rotation of the fastener.

In accordance with another feature of the invention, the channels 22 and 24 are provided with steps 46 and 47, respectively, which, as best seen in FIGS. 2 and 3, accommodate lateral translation of the hexagonal head portion 34 of the fastener 32 into the aperture 28 in the connector component 10 to effect assembly of the fastener 32 with the connector component 10.

After alignment of the central axis of the fastener 32 with the central axis of the aperture 28, in the movable component 10, the fastener 32 is displaced axially until the shoulder 42 thereon is seated on the counterbore 44 in the aperture 28. It is to be noted that in this condition, the spacing of the shoulders 36 and 38 precludes movement of the fastener 32 radially of the aperture 28 but that the counterbore 44 has a diameter that accommodates rotation of the fastener 32.

As best seen in FIG. 2, assembly of the fastener 32 with the connector component 10 is initiated by rotating the fastener 32 so that a pair of torquing flats 50 and 52 on the shoulder 42 of the head 34 thereon are aligned with the steps 46 and 47, respectively, in the channel 24. Translation of the fastener 32 into the aperture 28 of the component 10 is accommodated by the recess 35 in the head 34 of the fastener 32 which accepts the shoulders 36 and 38 that define the channel 24.

After assembly, the fastener 32 is moved downwardly, as seen in FIG. 5, until the shoulder 42 on the head portion 34 thereof is seated on the counterbore 44 of the aperture 28. In this position the fastener 32 is trapped against lateral movement relative to the aperture 28 yet is free to rotate therein.

It is to be noted that a counterbore 60 in the aperture 28 accommodates a socket (not shown) for applying torque to the fastener 32.

While the preferred embodiment of the invention has been disclosed, it should be appreciated that the invention is susceptible of modification without departing from the scope of the following claims.

I claim:

1. A fastener retention system for a connector component comprising:

an elongated generally cylindrical fastener comprising a threaded portion and an enlarged head portion, the head portion of said fastener comprising a pair of parallel radially and longitudinally extending flat surfaces spaced apart a dimension greater than the diameter of the threaded portion of said fastener, said flat surfaces extending laterally to points lying in a circle having a diameter greater than the spacing of the flat surfaces, the head portion of said fastener having a cylindrical recess intermediate longitudinally spaced ends thereof having a diameter less than the spacing of the flat surfaces thereon so as to define a plurality of axially spaced, radially extending, axially facing shoulders, and a connector component having a circular fastener accepting aperture therein of a diameter greater than the diameter of the cylindrical recess in the head portion of said fastener, the aperture in said component having first and second counterbores extending from opposite ends thereof, respectively, for the acceptance of the shoulders on said fastener, and a first channel in said component extending radially of the longitudinal axis of the aperture therein and of a width slightly greater than the diameter of the recess in the head portion of said fastener for the acceptance thereof in translation, said component having a second pair of channels on opposite sides of said first channel, respectively, of a width greater than the spacing of the flat surfaces on the head portion of said fastener but less than the diameter of the circle to which the shoulders on the head portion of said fastener extend, whereby said fastener is movable in translation into the aperture of said component when the flat surfaces on the head of the fastener are aligned with the second channels in said component but movement of said fastener out of said channels is inhibited when flat surfaces on the head portion of said fastener are rotated out of alignment with the second channels in said component.

2. The fastener retention system of claim 1 wherein the head portion of said fastener is hexagonal in radial cross section.

3. The fastener retention system of claim 2 wherein the aperture in said component has a third counterbore larger than the first and second counterbores therein for the acceptance of a tool engageable with the flat surfaces on the head portion of said fastener.

* * * * *